United States Patent
Colussi et al.

(10) Patent No.: US 11,345,195 B2
(45) Date of Patent: May 31, 2022

(54) AUTOMATIC PRESSURE VALVE FOR INFLATION / DEFLATION OF A PNEUMATIC ARRANGEMENT

(71) Applicant: COL-VEN S.A., Santa Fe (AR)

(72) Inventors: Primo Antonio Colussi, Alicante (ES); Natalio Domingo Venica, Santa Fe (AR)

(73) Assignee: COL-VEN S.A.

( * ) Notice: Subject to any disclaimer, the term of this patent is extended or adjusted under 35 U.S.C. 154(b) by 0 days.

(21) Appl. No.: 17/293,947

(22) PCT Filed: Aug. 6, 2020

(86) PCT No.: PCT/EP2020/072164
§ 371 (c)(1),
(2) Date: May 14, 2021

(87) PCT Pub. No.: WO2021/023828
PCT Pub. Date: Feb. 11, 2021

(65) Prior Publication Data
US 2022/0009298 A1 Jan. 13, 2022

(30) Foreign Application Priority Data
Aug. 7, 2019 (AR) .............................. P20190102248

(51) Int. Cl.
*F16K 15/20* (2006.01)
*B60C 29/00* (2006.01)
*B60C 23/00* (2006.01)

(52) U.S. Cl.
CPC .......... *B60C 29/002* (2013.01); *B60C 23/001* (2013.01); *F16K 15/20* (2013.01); *Y10T 137/3646* (2015.04)

(58) Field of Classification Search
CPC .. Y10T 137/3646; B60C 29/00; B60C 29/002
See application file for complete search history.

(56) References Cited

U.S. PATENT DOCUMENTS 3,450,147 A * 6/1969 Webb .................... B60C 29/068
137/226
9,308,788 B2 * 4/2016 Fazekas ................... F17D 3/01
(Continued)

FOREIGN PATENT DOCUMENTS

| EP | 0608491 A1 | 8/1994 |
| WO | 0157422 A1 | 8/2001 |
| WO | 2010004532 A1 | 1/2010 |

OTHER PUBLICATIONS

International Search Report and Written Opinion for International Application No. PCT/EP2020/072164, dated Nov. 27, 2020.

*Primary Examiner* — Robert K Arundale
(74) *Attorney, Agent, or Firm* — Howard M. Gilten, Esq.; Lewis Brisbois Bisgaard & Smith LLP (57) ABSTRACT

An Automatic pressure valve for the inflation-deflation of pneumatic arrangements comprises a main body (102) with an inlet connector (103) communicated with a pressurized air supply network an outlet connector connected to a pneumatic arrangement and a mechanical means which allows for a total or partial air passage or blockage to perform inflation-deflation operations of the pneumatic arrangement in a faster and practical way. The mechanical means comprises a main movable plunger (116) having an inner stepped through channel (117), a spring (120) arranged on a seat (121) defined in the inner stepped channel (117), an inflation plunger (122) operatively retained by said spring (120), a proximal movable end (126) within a first inner chamber (105), a reduced middle section (119), and a distal movable end (128) having a smaller diameter than the proximal end (126) and arranged within a second inner chamber (106).

9 Claims, 6 Drawing Sheets

(56) References Cited

U.S. PATENT DOCUMENTS

2002/0170597 A1\* 11/2002 Colussi ............... F16K 11/10
　　　　　　　　　　　　　　　　　　　　　　137/226
2007/0023083 A1\* 2/2007 Huang ................ F16K 17/196
　　　　　　　　　　　　　　　　　　　　　　137/226

\* cited by examiner

AUTOMATIC PRESSURE VALVE FOR INFLATION / DEFLATION OF A PNEUMATIC ARRANGEMENT

CROSS REFERENCE TO RELATED APPLICATIONS

This application claims priority from International Application No. PCT/EP2020/072164 filed Aug. 6, 2020, entitled AUTOMATIC PRESSURE VALVE FOR INFLATION/DEFLATION OF A PNEUMATIC ARRANGEMENT, which claims priority to Argentina Application No. P20190102248 filed Aug. 7, 2019; entitled PRESSURE VALVE FOR INFLATION/DEFLATION OF A PNEUMATIC ARRANGEMENT, the contents and elements of which are herein incorporated by reference for all purposes.

FIELD OF THE INVENTION

This invention relates to pressure control, regulation and calibration equipment in a pneumatic pressure arrangement and, more particularly, to an automatic pressure valve for the inflation/deflation of pneumatic arrangements which provides greater inner stability during inflation/deflation operations and, in the case of the use of the automatic pressure valve in tyres, it is intended to avoid the premature wear of the mechanical parts by adjusting the pressure to the ground or to grip requirements and also to obtain through a relationship among relative inner pressure differences in a faster and more practical and effective way the calibration of the tyre pressure of vehicle wheels according to the different uses and related circumstances.

PRIOR ART DESCRIPTION

The control, regulation and maintenance of the tyre pressure in vehicles in motion o in stationary vehicles is an issue that has been developed in the last years. The maintenance increase or reduction of tyre pressure are significant in competitions, cargo or passenger transport.

There are numerous arrangements designed for the maintenance, reduction or increase of tyre pressure both in tyres in motion or in stationary tyres. These arrangements are ordinarily called central systems of tyre inflation-deflation, for example of trucks, some of which are intended for tractors and others, for trailers, all of which require a big pipe for a fast inflation and deflation since air has to circulate along the pipe to the control central during both inflation and deflation, which besides causing pressure loss problems, it originates safety problems or immobilization of the vehicle in case of leaks or breaks in the pipe since it is directly connected to the tyre. The shafts of the vehicle equipped with these systems may be hollow with shaft ends commonly having a through-hole. The hollow shaft provides an advantageous conduit to supply air pressure to the wheel end. Between the shafts and the tyres or wheels, there is an arrangement of valves which allow for inflation-deflation, and there are also steering shafts and driving shafts, therefore the above-mentioned pneumatic circuit cannot be used in view of their particular design; consequently, there is an external pneumatic circuit for them.

Figure 1:
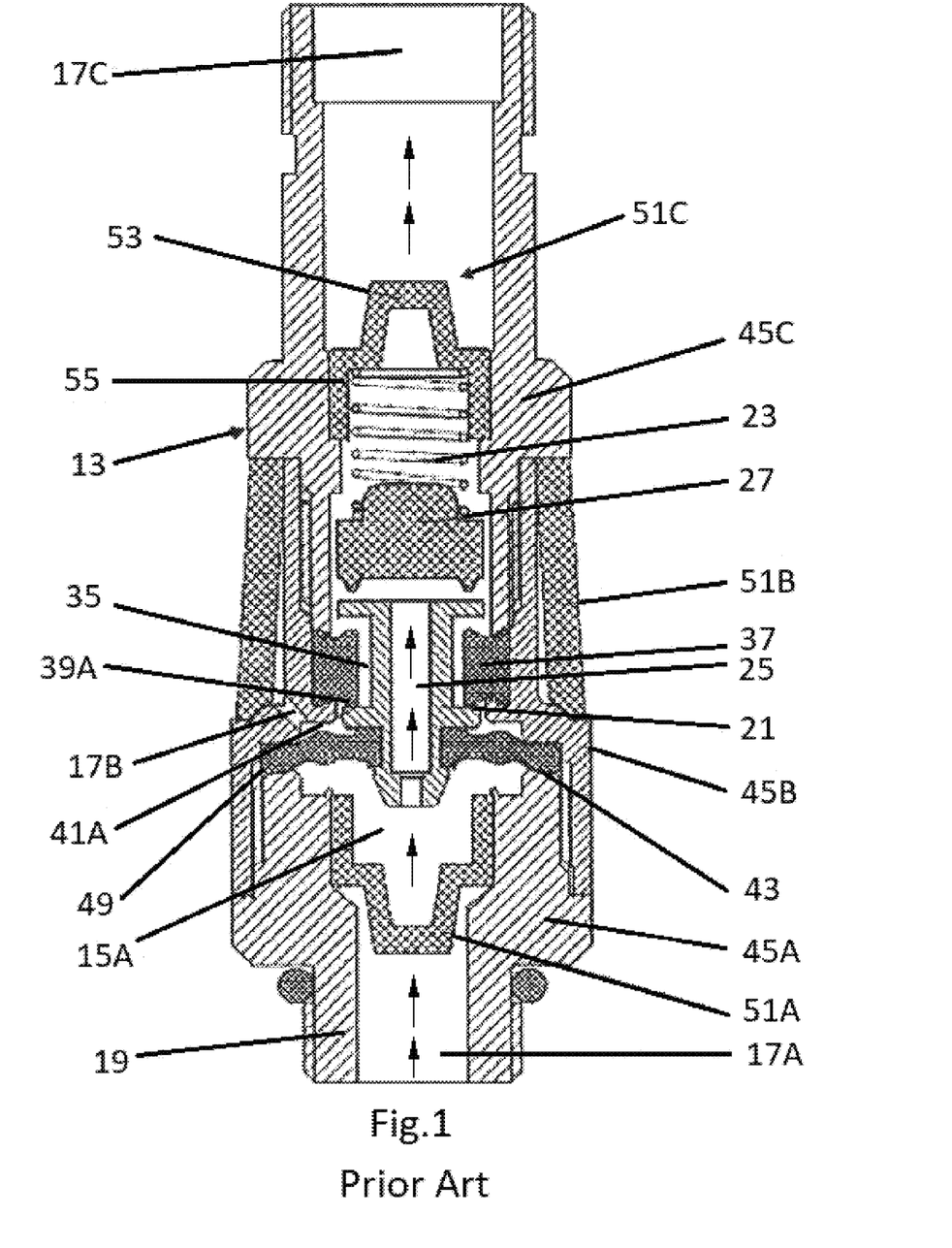
FIG. 1 shows a sectional view of an inflation-deflation valve according to the prior art.
Figure 2:
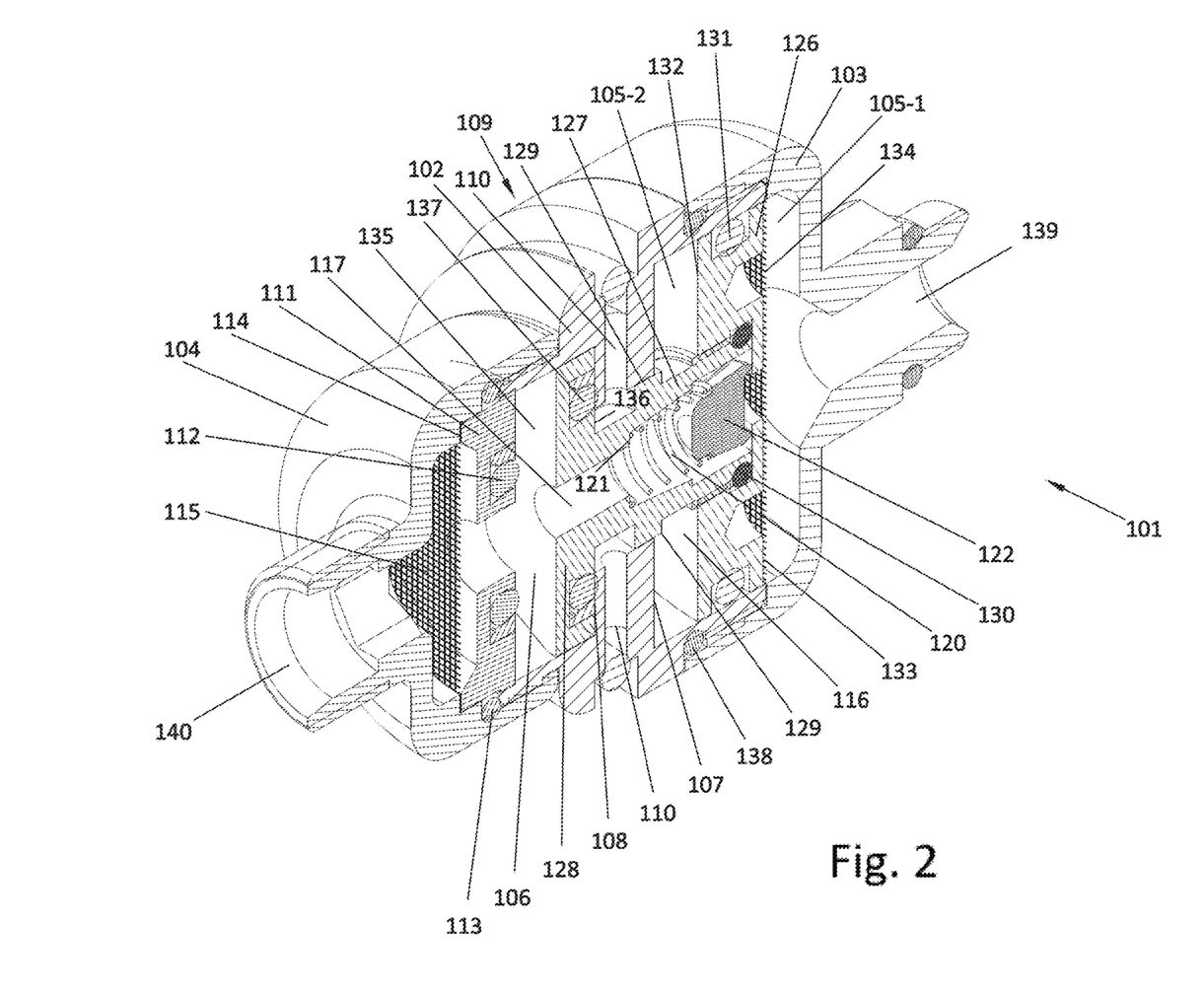
FIG. 2 shows a perspective and sectional view of the automatic valve according to the present invention.

Inflation-deflation valves are a key part to satisfactorily perform said operations. A type of valve is the valve described in the Patent Document U.S. Pat. No. 8,356,620 by the same owner. As it may be seen in FIG. 1 of U.S. Pat. No. 8,356,620, there is a pressure-controlled three-way valve that comprises a valve body, an inlet circuit in said valve body extending between an inlet port 17 A and a second port 17B, an outlet circuit 15B in said valve body extending between said second port 17B and said outlet port 17C; a plunger 21 located at said inlet circuit and connected to first pushing means 23 which pushes said plunger towards said inlet port 17A, said plunger having a pair of seats that have a pair of circumferential steps 41A, 41B formed on the outer wall surface of the plunger; a sealing ring 37 positioned between said steps that defines a pair of seals 39A, 39B; an outlet valve in said outlet circuit 15B, wherein said valve comprises said pair of seals that are capable of alternatively supporting against said pair of steps upon the plunger movement at least according to three positions, a first position to communicate the inlet port with the outlet port, a second position to close the communication between the outlet port, the second port and the inlet port, and a third position to communicate the outlet port with the second port. The valve also has a diaphragm 43 with a central part thereof being connected in a sealed way to the plunger and a periphery retained in a sealed way in the valve body, so that the diaphragm defines a seal between the outer wall surface of the plunger and the valve body in a position between the inlet port 17A and the second port 17B.

The valve is sufficiently described in the cited US document U.S. Pat. No. 8,356,620 and, consequently, it shall not be further described herein.

Although the disclosed valve has been proven to work in practice, certain instability of the inner elements has been detected, particularly of independent elements 23, 27, 55, 21, 43 and 37. Since said elements are independent, they are very susceptible and unstable upon changes in relative inner pressures between the air supply inlet path and the outlet path that is in connection with the tyre. In view of said instability, the inflation-deflation process is delayed and, sometimes, a failure may be caused, as a consequence of which the vehicle is stopped until a valve replacement is made. Therefore, the same owner has continued developing and investigating until surprisingly finding a solution as will be further described below in this invention.

BRIEF DESCRIPTION OF THE INVENTION

It is therefore an object of the invention to provide a new automatic pressure valve for inflation-deflation that provides greater inner stability of the mechanical elements during said operations and, consequently, more security and repeatability in the operation thereof.

It is still an object of this invention to provide an automatic valve having a single movable part that better dampens the pressure differences between the air supply inlet path and the outlet path that is connected with the tyre.

It is a further object of this invention to provide an automatic pressure valve for inflation/deflation of a pneumatic arrangement of the type comprising a main body wherein at least an inlet connector in communication with the pressurized air supply network and an outlet connector being operatively connected to the tyre (air deposit or controlled pneumatic device) are connected, the interior of the valve being provided with at least a mechanical means that allows for the total or partial air passage or blockage to perform the inflation-deflation operations of the respective pneumatic arrangement, wherein said mechanical means comprises a main movable plunger having: an inner stepped through channel, a spring being arranged on a seat defined in a portion of the inner stepped channel, an inflation plunger being operatively retained by said spring, a proximal end that is movable within a first inner chamber, a reduced middle section, and a movable distal end with a smaller diameter than the proximal end and arranged within a second inner chamber.

BRIEF DESCRIPTION OF THE DRAWINGS

For the purpose of providing more clarity and a better understanding of the subject-matter of the invention, the invention is illustrated in several figures, in which it is represented in one of the preferred embodiments, all of which by way of example, wherein.

DETAILED DESCRIPTION OF THE INVENTION

With reference to the figures, it may be seen that the present invention is directed to a new automatic pressure valve for the inflation-deflation of pneumatic arrangements that provides greater stability of the internal components thus better dampening pressure differences in order to perform the inflation-deflation operations in a much faster and much more practical and effective way and avoid the problems mentioned in the prior art. It is to be noted that the automatic valve of the present invention may be used in any kind of vehicle without being limited to only heavy transport vehicles and even in stationary facilities wherein the pressure control of a pneumatic deposit or device is required.

According to FIGS. 2 to 6, the present invention is indicated by the general reference 101 and comprises a main body 102 wherein at least an inlet connector 103 in communication with the pressurized air supply network and an outlet connector 104 being operatively connected with the pneumatic device are connected. Said main body 102 has in its interior a reduced middle inner section 109 that separates a first chamber 105 and a second chamber 106, thus defining at least a first stop face 107 in the first chamber 105 and a second stop face 108 in the second chamber 106.

As it may be seen in FIGS. 2 to 5, said first chamber 105 is defined between the reduced middle inner section 109 of the main body 102 and the interior of said inlet connector 103, while said second chamber 106 is defined between said reduced middle inner section 109 of the main body 102 and the interior of said outlet connector 104. Likewise, the reduced middle inner section 109 of the main body has respective air escape axial paths 110 in communication with the valve interior. In said second chamber 106, a closing lid 111 is provided, said closing lid 111 having a deformable sealing ring 112 and being retained against the inner walls of the outlet connector 104 by means of a seal 113 and in contact with an inner step 114 thereof, and an air filter mesh 115 being arranged between the inner step 114 of the outlet connector and the closing lid 111. Likewise, the seal 113 allows for the sealing between the main body 102 and the outlet connector 104.

On the other hand, the valve of the present invention is provided in the interior thereof with at least a mechanical means comprised by a main movable plunger 116 that allows for the passage or total or partial blockage of the air passage or flow to perform the inflation-deflation operations of the respective pneumatic device, wherein the main movable plunger 116 has an inner stepped through channel 117 with respective ends 118 with the same diameter and a truncated cone-shaped middle section 119, and a spring 120 being arranged on a seat 121 defined in a portion of the inner stepped channel 117, more particularly in the truncated cone-shaped section 119. An inflation plunger 122 is operatively retained by said spring 120 through the first end 123 that fits into the spring and it also has a second end having a circumferential lip 124 in contact with an inner step 125 of channel 117.

Likewise, the main plunger 116 has a movable proximal end 126 arranged within the first inner chamber 105 which divides said first inner chamber 105 into two sub chambers 105-1 and 105-2, a reduced middle section 127 and a movable distal end 128 having a smaller diameter than the proximal end 126 and being arranged within the second inner chamber 106. The reduced middle section 127 of the main plunger has restriction sections 129 in operative communication with the air escape axial paths 110 and is in connection with the proximal end 126 through an inner sealing ring 130. The proximal end 126 has a deformable seal 131 that prevents the pressurized air of the network 139 that is in chamber 105-1 from leaking into the chamber 105-2, it further has an inner face 132 in operative contact with the first stop face 107, and an air filter mesh 134 is arranged between the central body 102 and the inlet connector 103. The distal end 128 has an outer face 135 in contact with the closing lid 111, and an inner face 136 that is provided with a deformable sealing ring 137 and in contact with the second stop face 108.

It is to be noted that said inlet connector 103 is sealed on the main body 102 by means of a seal 138 in the inner step of the connector 103, settles an air filter mesh 134, and is held by the main body 102. Both the inlet connector 103 and the outlet connector 104 comprise respective nipples and have corresponding inlet paths 139—outlet paths 140 for the passage of air that are in communication with the air supply network and the pneumatic device, respectively. Likewise, the filter meshes avoid the entrance of dirt or small elements that may affect the valve functionality.

In this way, the valve of this invention is composed and built. As it may be seen in FIGS. 2 to 5, the valve of this invention has a main plunger 116 which is a single movable part in the interior thereof. This feature avoids the problems mentioned in the prior art wherein the independent elements cause significant instabilities and a high likelihood of failures during the inflation-deflation operations. By means of the main plunger 116 and the closing lid 111, the invention provides a mechanical means that is jointly movable owing to the inner pressure differences between the first chamber 105-1 that is in communication with the air supply network and the second chamber 106 that is in communication with the pneumatic tyre. Given that only one element is moved, the above-mentioned instabilities are avoided since a gradual movement damping is provided so that the inflation and deflation operations may be performed in a much faster and much more practical and effective way.

Whenever a specific mention of the inflation-deflation of the tyre is made, it is necessary to bear in mind all of the possible situations that vehicles equipped with the valve of this invention may face. It means that the valve of this invention allows for the total or partial inflation-deflation in a much faster way than the conventional valves of the prior art.

As far as the operation of the valve of this invention is concerned, some applicable examples shall be provided without implying a limitation of the invention since other situations may arise and be carried out without inconvenience through the use of the valve of the invention for the adjustment of the pneumatic pressure to the kind of ground, load, speed and grip requirements, which is essential for the vehicle to continue in motion, especially when the vehicle moves on a loose, unstable or low-grip ground, even for its use and application in pneumatic devices or facilities different from vehicle pneumatic tyres such as in example 4 or the like that are not related to or installed in vehicles.

Example 1

Start-up. Initial conditions: Pneumatic tyre pressure: 100 psi; state of the automatic valves of this invention 101: "Blockage"; pressure in the feeding network of each shaft: 0 psi. Calibration pressure of the equipment 201: 100 psi.

The driver gets into the truck and starts the engine to begin the journey, for example, to a construction site. To such effect, the equipment 201 is active and waiting for the pressure generated by the vehicle compressor (inlet pressure) to be proper to begin working. The automatic valves 101 arranged in each pneumatic tyre are at the moment in a retention status since there is not air pressure in the feeding network of each shaft.

A reading panel 202 (FIG. 6) has a lit LED which indicates that the equipment is in a high-pressure status (HIGH). The reading panel also shows that the pressures present in each shaft 203 and the inlet pressure that fees equipment 201. For example: Shaft 1: 100 psi. Shaft 2: 100 psi. Shaft 3: 100 psi. Inlet pressure (P): rising.

Figure 3:
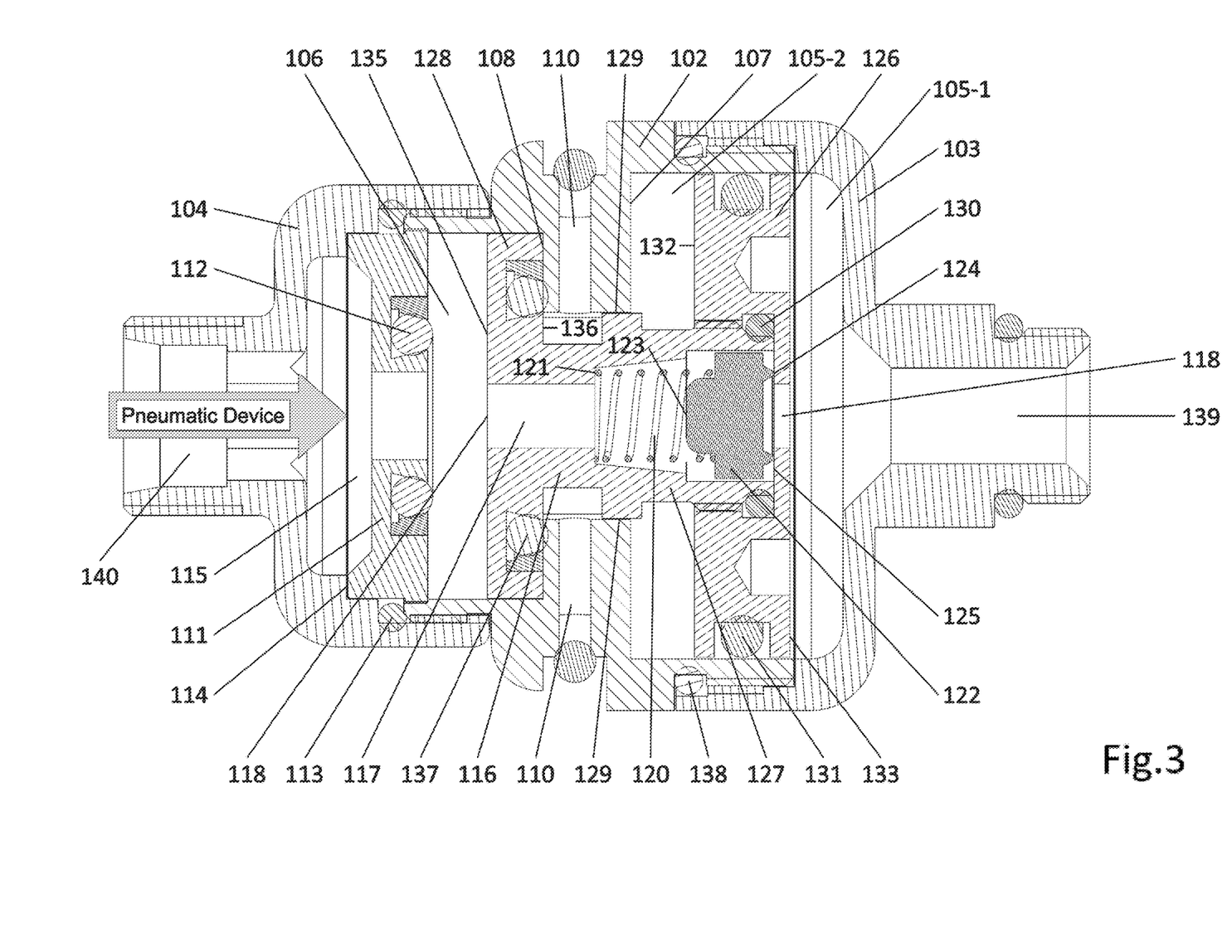
FIGS. 3 to 5 show sectional views of possible situations wherein the inflation-deflation valve according to the present invention may be seen.

According to FIG. 3, the automatic valve is blocked. This status arises when the pressure of the inlet path 139 is in 0. The pressure acting on the main plunger 116 of the valve is the tyre calibration pressure, that is to say the pressure existing in the outlet path 140, thus holding the main plunger on the end "B", more particularly when the inner face 136 of the distal end 128 is in contact with the second stop face 108. The retention of the tyre air is achieved by means of the deformation of the sealing ring 137 embedded in the main plunger with the second stop face 108, thus preventing the air from leaking into the escape paths 110. This pressure also acts onto the lower face of the inflation plunger, thus contributing to block channel 117 and, in this way, preventing the tyre air from flowing into the inlet path 139. Once the inlet pressure is stable, the equipment 201 pressurizes the network of each shaft 203 at the scheduled calibration pressure (100 psi) thus generating a new valve status.

Figure 4:
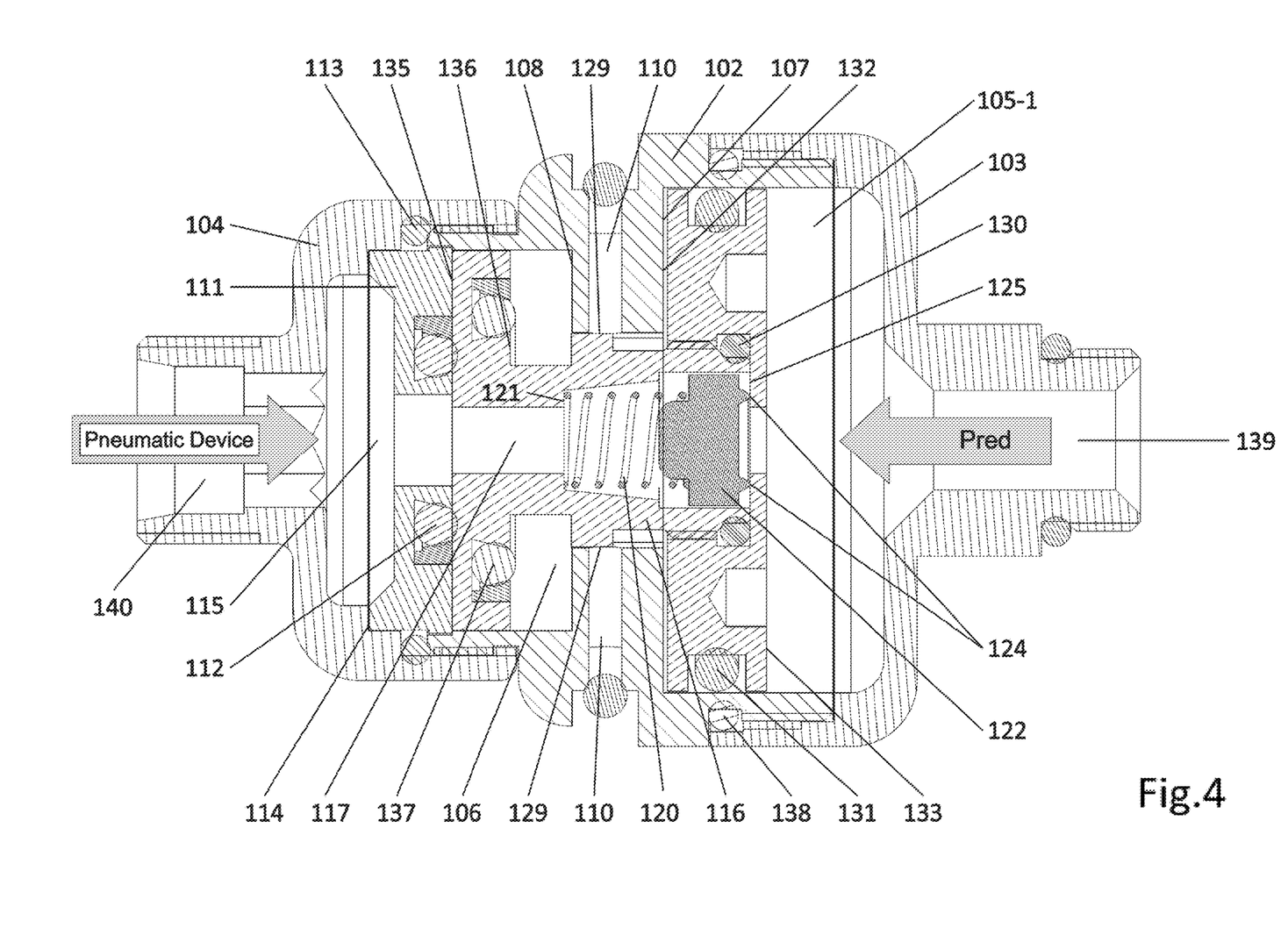

According to FIG. 4, a retention status is caused when the network pressure and the tyre pressure are equal. When pressurized air is supplied at a desired pressure in the inlet path 139, said desired pressure being equal to the tyre calibration pressure of the outlet path 140, the main plunger 116 moves towards the left until it reaches the end "A", more particularly when the outer face 135 of the distal end 128 is in contact with the closing lid 111. This movement happens because the proximal end section of the main plunger next to the first chamber 105-1 is bigger than the distal end section that is next to the second chamber 106. The tyre air retention is achieved by means of the axial deformation of the sealing ring 112 embedded in the closing lid 111 with the distal end 128 of the main plunger, thus preventing the air from flowing into the escape paths 110.

Example 2

Load to a given value of the tyre of the above-mentioned example. Initial conditions: Tyre pressure: 100 psi. Automatic valve status: retention under equal pressure. Pressure in the feeding network of each shaft: 100 psi. Calibration pressure of the equipment 201: 30 psi. It is the pressure the tyres will reach at the end of this status.

Initially, the reading and tyre pressure control panel 202 (FIG. 6) shows the following status: the pressures of each shaft 203 is of 100 PSI. The LED is lit which indicates that the equipment is at a high-pressure status (HIGH). Valves 101 are in a retention status under equal pressure of the network and the tyre. When pressing on a key H/L, a shift in the equipment status from high to low pressure happens and the LED turns on. In order that deflation is caused, it is necessary that the valves shift to a blockage status. To such an effect, a depressurization module 204 activates so that the pressure in the network of each shaft falls down to 0 and the above-mentioned status shift occurs. By complying with this requirement, the equipment 201 starts the tyre deflation from 100 PSI to 30 PSI.

In order that the valve 101 begins the status shift, the pressure in the first chamber 105-1 must be less than 1/10 of the pressure existing in the outlet path 140 or second chamber 106 due to the relationship of the section of the outlet seals and the piston. At this moment, the second chamber 106 and the truncated cone section 119 are pressurized with the outlet pressure or tyre pressure which, being 10 times higher than the inlet pressure 139, immediately move the plunger towards position "B" thus finishing the status shift. It is to be noted that once the valves have made the status shift, the equipment 201 may pressurize the network again to reach the new desired pressure in the tyres so that the valves start deflation thereof.

It is required in order that the valves work in the deflation status that the valve 101 is initially at the blocked status; that is to say, that the pressure of the inlet path 139 is 0. It is achieved by depressurizing the air feeding network. And, in order to deflate the tyre, the pressure in the inlet path 139 cannot be less than 25% of the pressure existing in the tyre or outlet path 140. Under these circumstances, when pressurized air is supplied at a desired pressure into the inlet path 139, said pressure being less than the tyre calibration pressure or the pressure of the inlet path 140, the main plunger partially moves towards the left thus enabling the valve escape paths 110 which causes the loss of air of the tyre. The partial movement is kept by the pressure generated in chamber 105-2 of the main plunger which is the same pressure generated in the escape paths 110. This compensation is caused through sections 129 of the plunger and the middle section of the valve body.

As the pressure in the tyre or outlet path 140 falls down, the main plunger 116 is increasingly moved towards the left. The plunger has a particular design so that as the tyre pressure continues falling down, the geometry of sections 129 restricts the escape paths 110 thus slowing down the deflation in order to reach the expected equal pressures and in order that the main plunger 116 does not reach the end "A" before the desired time. Considering that there exist load drops between the actual tyre pressure and the pressure that "measures" or "compares" the valve during deflation, this restriction is oriented to reduce the air flow and the load drop while the tyre approaches the comparative or desired pressure that is present in the inlet path 139.

Once the pressures have been equalized, the main plunger 116 is at the end "A" since at a certain point of the plunger movement, the geometry of the sections 129 allows the escape paths to depressurize the chamber 105-2 of the main plunger, and, consequently, the pressure differences among the chamber 105-1, the chamber 105-2 and the truncated section 119 immediately force the plunger into position "A". The tyre air retention is performed in the same way as in the inflation status.

Example 3

Tyre inflation. Initial conditions: Tyre pressure: 30 psi. Valve estate IRD: retention under equal pressure. Pressure in the feeding network of each shaft: 30 psi. Calibration pressure of the equipment 201: 100 psi. This is the pressure the tyres will reach at the end of this status.

Initially, the panel (FIG. 6) shows the following status: the pressures of each shaft 203 is of 30 PSI. The LED is lit which indicates that the equipment is at low pressure (LOW). The valves 101 are in a retention status under equal pressure of the network and the tyre. When the key H/L is pressed, the status shift of the equipment happens from low to high pressure. It is at this moment when the LED turns on and the equipment 201 starts inflating the tyres from 30 PSI to 100 PSI.

Figure 5:
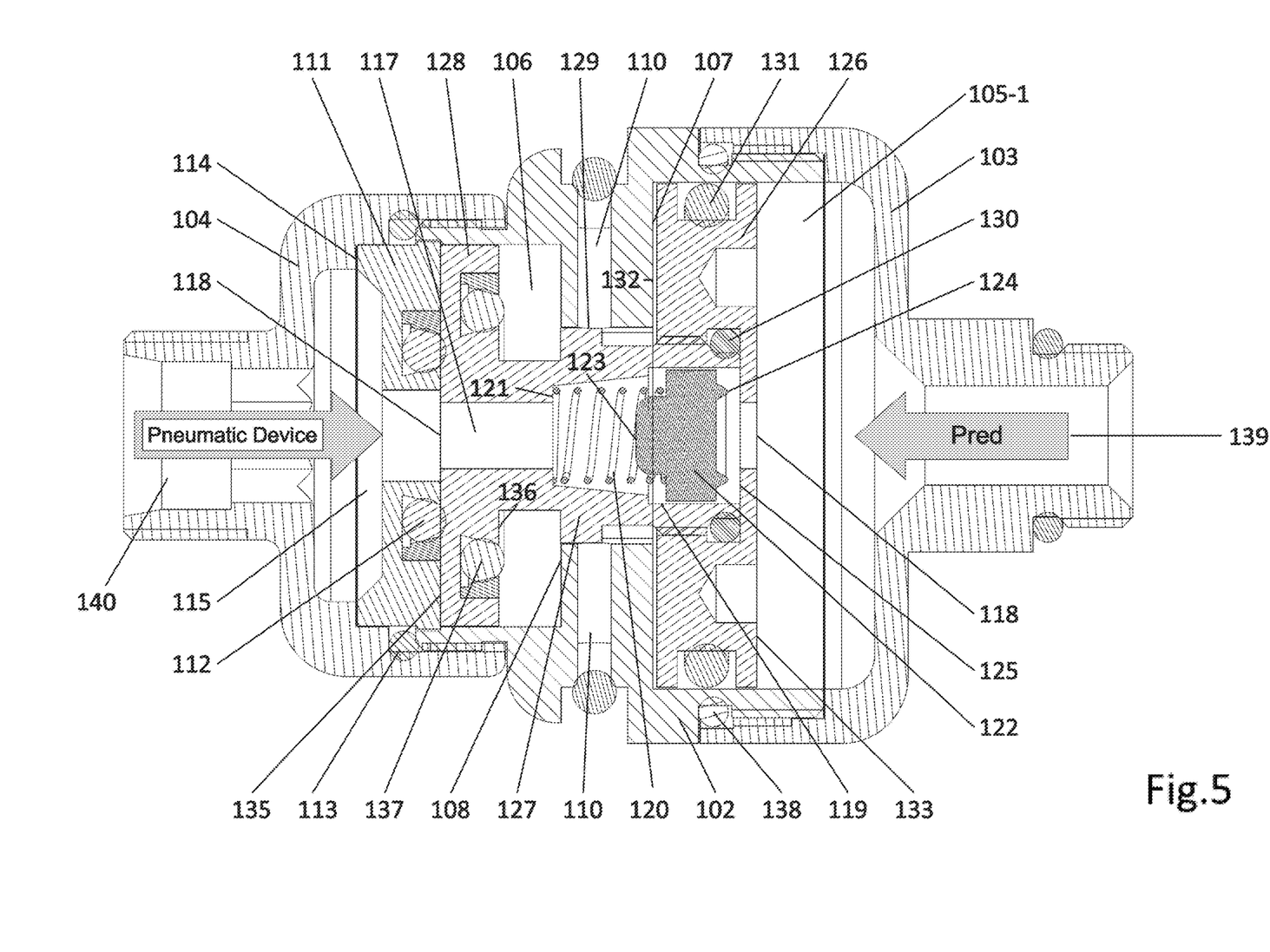
Figure 6:
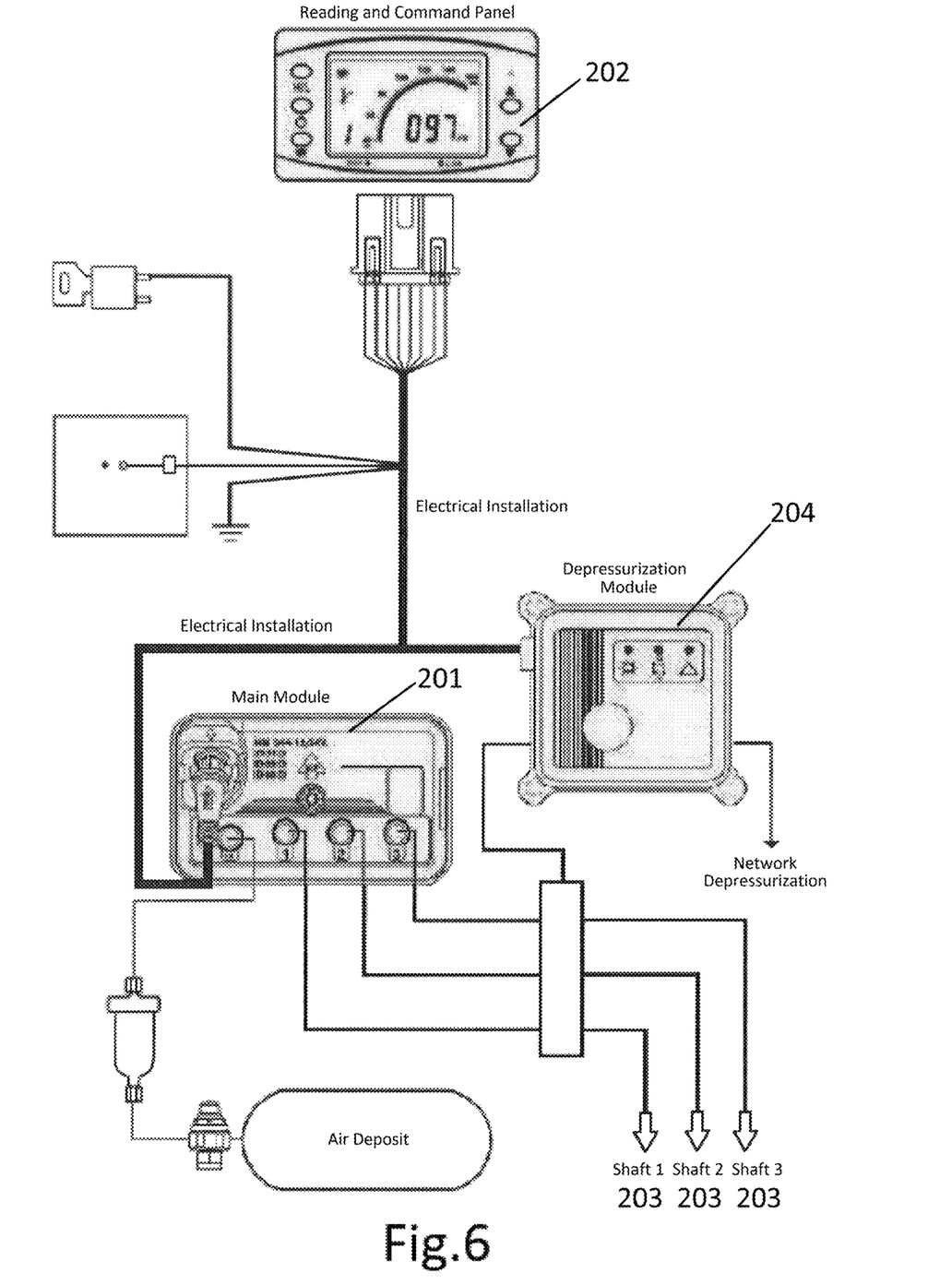
FIG. 6 shows a schematic view of a general arrangement that allows for the control and actuation for tyre inflation-deflation.

According to FIG. 5, the valves are in an inflation status. When pressurized air is supplied at a desired pressure in the inlet path 139, said desired pressure being greater than the calibration pressure of the tyre or outlet path 140, the main plunger 116 is on the end "A". The tyre air retention is achieved by means of the axial deformation of the sealing ring 112 embedded in the valve closing lid 111 with the distal end 128 of the main plunger. In this way, air is prevented from leaking into the escape paths 110. At this moment, the pressure existing in chamber 105 acts onto the inflation plunger 122 which is accommodated within the main plunger, and overcomes the spring 120, thus enabling the inner channel 117 and allowing for the tyre inflation. The radial deformation of the sealing ring 131 of the main plunger 116 with regard to the main body 102 of the valve avoids the passage of air from chamber 105 to the escape paths 110 thereof.

Example 4

A pneumatic cylinder or chamber acting as a holder, shock absorber, spring or variable spring support to support a variable load needs a pressure adjustment in order to work properly when its working conditions (load) vary or a variation is required in its movement or compression characteristics (spring constant) as in the case of pneumatic bellows installed for the support of the original suspension in certain vehicles under load conditions.

The described valve allows for the automatic pressure adjustment (support force) of these pneumatic bellows according to the load requirements or the requirements of the operator. Said valve would also allow for a completely stand-alone and automatic operation of the device incorporating a load sensing and suspension position arrangement.

It is to be noted that the above-mentioned examples are not limitative of this invention since other situations may be possible and solved by means of the valve of the invention without inconvenience. In this way, the valve of the invention allows for the inflation-deflation of pneumatic devices in a more stable and safe way, and satisfactorily dampening inner pressure changes between the inlet path and the outlet path and avoiding inconveniences in the stability of the inner mechanism.

The invention claimed is:

1. An automatic pressure valve (101) for the inflation/deflation of pneumatic arrangements of the type comprising a main body (102) to which at least an inlet connector (103) in communication with a pressurized air supply network and an outlet connector (104) operatively connected to a pneumatic arrangement are connected, wherein in the interior of the automatic pressure valve (101) at least a mechanical means is provided; the mechanical means allowing for a total or partial air passage or blockage to perform inflation-deflation operations of the respective pneumatic arrangement, said automatic pressure valve (101) being characterized in that:

said mechanical means comprises a main movable plunger (116) having a proximal movable end (126) and a distal movable end (128), the distal movable end (128) having a diameter smaller than a diameter of the proximal movable end (126), with the proximal movable end (126) being disposed within a first inner chamber (105) and the distal movable end (128) being disposed within a second inner chamber (106), an inner stepped through channel (117)) in the main movable plunger (116), a spring (120) arranged on a seat (121) defined in a portion of the inner stepped channel (117), an inflation plunger (122) in the inner stepped through channel (117), being operatively retained by said spring (120) against an inner step (125) in the proximal movable end (126), a reduced middle section (127) in the main movable plunger (116), and wherein said distal movable end (128) has an outer face (135) contactable with a sealing ring (112) in a closing lid (111), and an inner face (136) provided with a sealing ring (137) capable of entering into sealing contact with an at least one stop face (108) defined in the main body (102).

2. An automatic pressure valve according to claim 1, wherein said main body (102) has in its interior a reduced middle inner section (109) that separates said first inner chamber (105) and second chamber (106) and defines said at least one stop face (108) in the second chamber (106), said first inner chamber (105) being in turn divided into two sub chambers (105-1, 105-2).

3. An automatic pressure valve according to claim 2, wherein said first inner chamber (105) is defined between the reduced inner middle section (109) of the main body (102) and the inlet connector (103), while said second chamber (106) is defined between said reduced inner middle section (109) of the main body (102) and said outlet connector (104).

4. An automatic pressure valve according to claim 1, wherein said main body (102) has a reduced middle inner section (109) and the reduced inner middle section (109) of the main body (102) has respective air escape axial paths (110), each being in communication with the interior of the automatic pressure valve (101).

5. An automatic pressure valve according to claim 1, wherein said closing lid (111) is disposed in the second chamber (106), the closing lid is retained against the inner walls of the outlet connector (104) by a seal (113), and in contact with an inner step (114) of the outlet connector (104), and an air filter mesh (115), said air filter mesh (115) being disposed between the inner step (114) of the outlet connector (104) and said closing lid (111).

6. An automatic pressure valve according to claim 1, wherein said reduced middle section (127) of the main movable plunger (116) has a restriction sections (129) in operative communication with air escape axial paths (110) and in connection with the proximal end (126) through an inner sealing ring (130).

7. An automatic pressure valve according to claim 1, wherein said main body has inner walls and the proximal end (126) has a deformable seal (131) in sealing contact to the inner walls of the main body (102).

8. An automatic pressure valve according to claim 1, wherein said said closing lid (111) is retained against the inner walls of the outlet connector (104) by a seal (113), and in contact with an inner step (114) of the outlet connector (104), and with an air filter mesh (115), disposed between the inner step (114) of the outlet connector (104) and said closing lid (111).

9. An automatic pressure valve according to claim 4, wherein said reduced middle section (127) of the main movable plunger (116) has restriction sections (129) in operative communication with air escape axial paths (110) and in connection with the proximal end 026) through an inner sealing ring (130).

* * * * *